Jan. 23, 1968  J. SIBRAVA ETAL  3,364,533
CLAMPING DEVICE

Filed Aug. 16, 1965  2 Sheets-Sheet 1

INVENTOR
Joseph Sibrava
Charles J. Klara
BY DeLio and Montgomery
ATTORNEYS

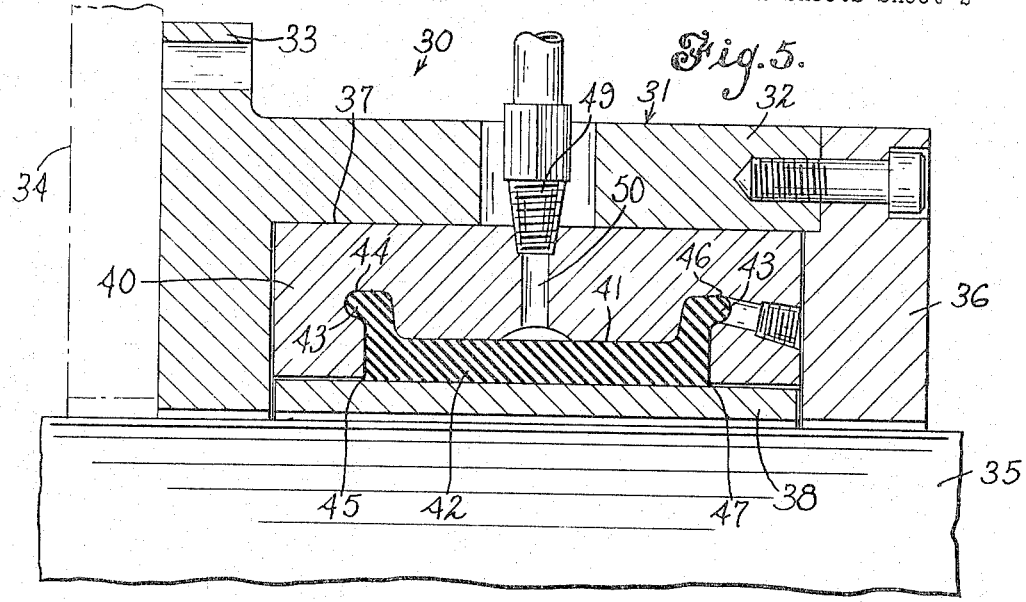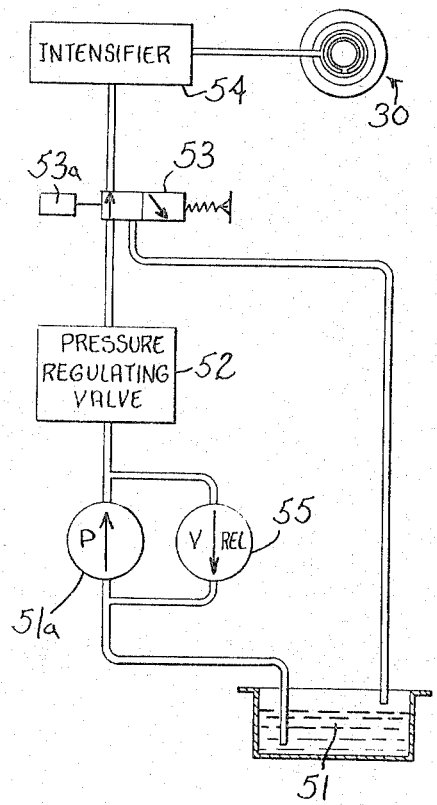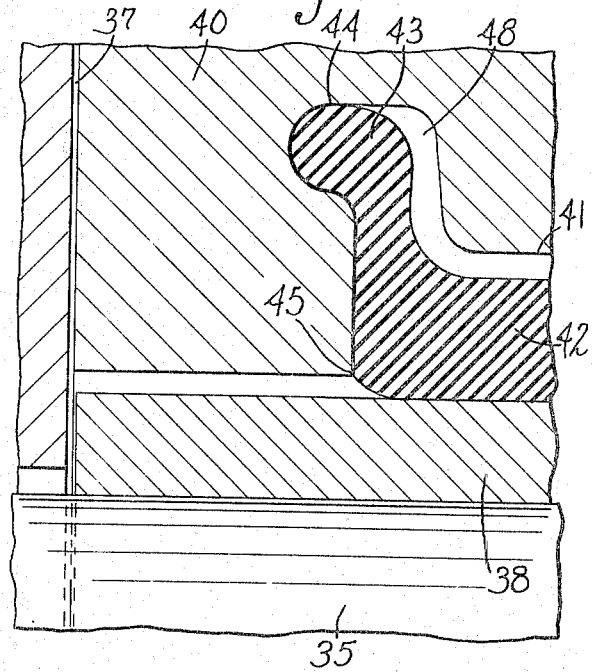

United States Patent Office 3,364,533
Patented Jan. 23, 1968

3,364,533
CLAMPING DEVICE
Joseph Sibrava, Fairfield, and Charles J. Klara, Seymour, Conn., assignors to Farrel Corporation, Ansonia, Conn., a corporation of Connecticut
Filed Aug. 16, 1965, Ser. No. 479,968
10 Claims. (Cl. 24—243)

ABSTRACT OF THE DISCLOSURE

This disclosure relates to a clamping device adapted to clamp about a shaft or similar object which comprises an enclosed housing having the shaft passing therethrough. Within the housing is a mass of elastomeric material formed to the size and shape of the housing cavity and in a relaxed position completely filling such cavity. The mass of elastomeric material is cast about a sleeve of elastomeric material having a more dense composition and is bonded to the outer surfaces of the sleeve. Then when fluid pressure is introduced to the surfaces the unbonded surfaces of the elastomeric material and the sleeve, an expansible cavity is formed. Coaxially within the elastomeric material is a clamping device adapted to fit about and receive therethrough a shaft. Upon expansion of the expansible cavity, the clamping device is contracted about the shaft to clamp the overall assembly in a given position on the shaft.

---

This invention relates to clamping devices, and more particularly relates to apparatus for clamping and locating a member in a given position along the length of an object such as a shaft.

The present invention provides a new and improved clamping device, particularly adaptable for clamping an object along the length of a shaft in any of an infinite number of positions. A clamping device embodying the invention is arranged to frictionally engage a shaft or other object upon which it is movable and comprises new and improved means for compressively forcing a gripping element into tight frictional engagement with a shaft and thereby locking the clamping device in a given position on the shaft. The clamping device includes fluid-actuated expansion means defining an expansible cell which is expanded upon application of fluid pressure thereto to actuate a friction device.

The cell comprises an expansible material, such as rubber or an elastomeric substance which is bonded either to a restraining member or to another expansible member to define an expansible cavity. The line of bond between the members comprising the cell is so defined that when the cell is expanded the line of bond is subjected to essentially only compressive forces which tend to strengthen the bond and prevent tearing or shearing thereof. Additionally, the elements of the cell are so dimensioned that expansion of the material thereof is within predetermined limits. This construction provides an expansible cell which may be repeatedly cycled without endangering the aforementioned bond or fatiguing the material of the cell.

Accordingly, an object of this invention is to provide a new and improved clamping device. Another object of this invention is to provide a clamping device of the type described having a new and improved fluid-actuated expansion means for actuating a frictional gripping member.

Another object of this invention is to provide a new and improved shaft clamping device for clamping and locking a member on a shaft or rod in a predetermined relation.

A further object of this invention is to provide a new and improved clamping device utilizing a new and improved expansible cell which is removable from a reaction cavity.

A further object of this invention is to provide a clamping device having a new and improved expansible cell comprising an elastomeric or rubber-like material bonded therein or to another cell forming member wherein the line of bond is so defined that upon expansion of the cell the line of bond is predominantly in compression and only slight shearing forces are exerted thereon or on the material forming the cell.

The novel features comprising the invention are particularly pointed out and distinctly claimed in the claims appended to and forming a portion of this specification. The invention, however, both as to its organization and operation, together with further objects and advantages thereof, may best be appreciated by reference to the following detailed description taken in conjunction with the drawings, in which:

FIG. 5 is a view in quarter section of the device of FIG. 4 as seen in the plane of lines 5—5 in FIG. 4;

FIG. 6 is an enlarged sectional view of a portion of the device of FIGS. 4 and 5 when fluid pressure is introduced thereto; and FIG. 7 is a schematic diagram of a hydraulic system for introducing fluid under pressure to the various clamping devices illustrated.

Figure 1:
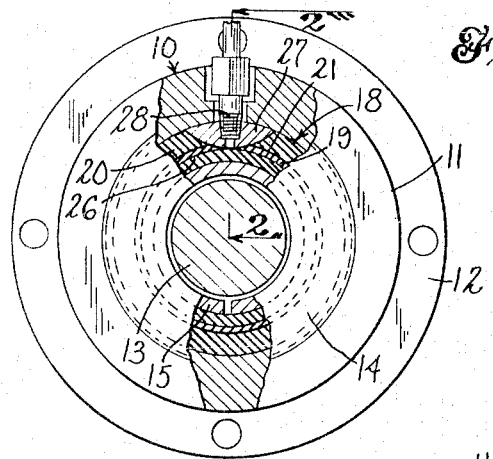
FIG. 1 is an end view of a clamping device embodying the invention which is partially broken away to show the interior elements thereof.

A device embodying the invention in one form thereof comprises a reaction member in the form of housing 10 having a generally cylindrical portion 11 and a flange 12 at one end thereof adapted to receive hereon an object (shown in broken line) to be located and clamped to a shaft 13. At the opposite end thereof housing member 10 threadably receives an end closure plate 14. A frictional clamping member in the form of a split sleeve 15 is disposed about shaft 13 and defines with housing 10 an annular cavity 16. Disposed within cavity 16 is an annular elongated expansible cell 18 which comprises a first sleeve-like member 19 surrounded by a second member 20 throughout 360° on either side thereof and also at the ends thereof. Member 20 is bonded to member 19 along the surfaces represented by a line 21 between the points 22 and 23. For reasons hereinafter explained, member 19 may be formed with outwardly extending beads 24 and 25 at the ends thereof. Alternatively, for reasons hereinafter explained, member 19 may be formed with a uniform thickness along its length.

Both of members 19 and 20 are of rubber or other elastomeric material. Members 19 and 20 are unbonded at the surfaces represented by a line 26 extending between points 22 and 23 and, therefore, the members 19 and 20 define an expansible chamber therebetween.

In a preferred technique of constructing the cell, the member 19 is first cast in an elastomeric material of high tensile strength with an adaptor plug 27 bonded thereto. Subsequently, a second casting operation is performed in which the member 20 is cast about member 19 and the curved surface of plug 27. Prior to the second casting operation, the outer surface between points 22 and 23 is coated with a suitable bonding agent and the surface between points 22 and 23 as represented by line 26 is coated with a release agent so that the material of member 19 will have no tendency to bond along the surface defined by line 26. Plug 27 is tapped and threaded to receive a threaded fitting 28 therein which leads to a fluid pressure source as will hereinafter be described.

Figure 3:
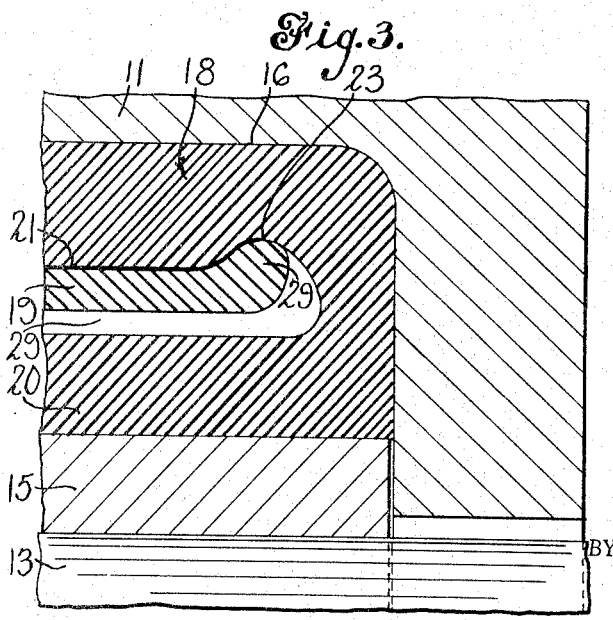
FIG. 3 is an enlarged view of a portion of the device of FIGS. 1 and 2 with fluid pressure introduced into the expansible cell.

When fluid pressure is introduced through fitting 28, a chamber 29 defined by members 19 and 20 is expanded as more clearly shown in FIG. 3. When the chamber 29 is expanded, the innermost surface of member 20 compressively engages sleeve 15 which compressively engages shaft 13 and locks the device 10 on shaft 13. In accordance with the invention, the members 19 and 20 are so shaped that the surface of bond between points 22 and 23 is placed predominantly and essentially only in compression upon expansion of cavity 29.

In FIG. 3 it may be seen that when fluid pressure expands cavity 29, the ends thereof adjacent beads 24 and 25 are also expanded and the material of member 19 adjacent the beads 24 and 25 is elongated. It may thus be seen that all along the line or surface of bond such surface is essentially only in compression due to the pressure of the fluid in chamber 29. This arrangement reacts in two ways to prevent any tendency for the fluid pressure to shear the bond. First, the forces exerted on the line or surface of bond are in compression and, second, such compressional forces reinforce the bond against any shearing forces which would be substantially perpendicular to the compressive forces. Additionally, it may be noted that the dimension of the beads 24 and 25, as exemplified by bead 25 is so selected in relation to the necessary distance of elongation of the end portions of member 19, that the degree of elongation is a function of the particular elastomeric material and the radial motion of the clamping member.

These dimensions are so selected that the tendency of fatigue or shearing of material in this area is greatly reduced, if not eliminated.

Figure 2:
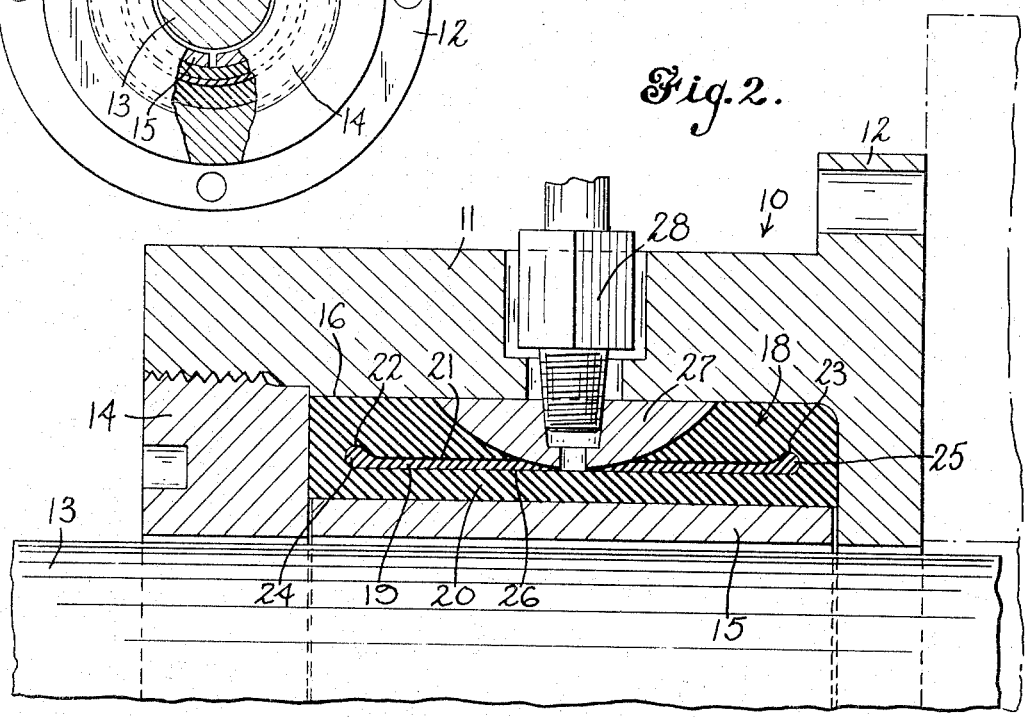
FIG. 2 is a sectional view of the device of FIG. 1 seen in the plane of lines 2—2 of FIG. 1.

The size of the cavity 16 and the cell 18 are so selected that the cell essentially or completely fills the cavity when the cell is in its unexpanded condition, as shown in FIG. 2. As a result, upon expansion of chamber 29, only a short radial movement of the material forming member 20 is required to compress sleeve 15 tightly about shaft 13. Since only a relatively small quantity of hydraulic fluid is required for this short stroke, clamping may be very rapidly accomplished.

While many various elastomers may be satisfactory in the construction of cell 18, polyurethane rubber is preferred. Polyurethane elastomers or rubbers have very high tensile strength and very good resistance to many hydraulic fluids and, hence, will not suffer deleterious effects from the hydraulic fluid which may be introduced into chamber 29.

Figure 4:
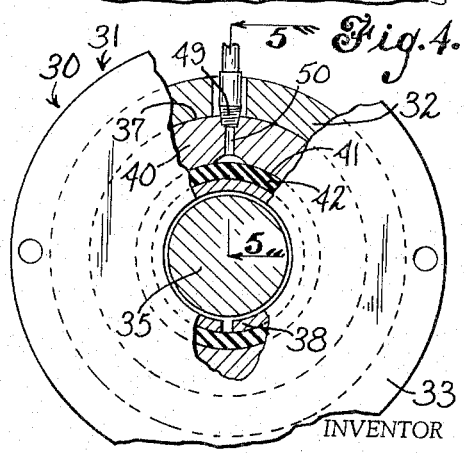
FIG. 4 is an end view of another embodiment of the invention with portions thereof broken away to show interior elements thereof.

Another embodiment of the invention is illustrated in FIGS. 4, 5 and 6. A clamping device 30 comprises a housing or reaction member 31 having a generally cylindrical longitudinally extending portion 32 and an end closure and flange portion 33 adapted to contact and be attached to an object 34 to be clamped on a shaft 35. An end closure member 36, together with housing member 31 defines an annular cavity 37 about a clamping member in the form of split sleeve 38. In this embodiment of the invention an elastomeric element is bonded directly to a reaction member 40. A recess or chamber 41 machined in member 40 receives therein an elastomeric element 42 which is essentially of sleeve shape with outwardly extending flanges or ears 43 at either end thereof received into mating portions of chamber 41. The elastomeric element is bonded to member 40 on the surfaces defined by points 44, 45 and 46, 47, 360° at each end and is unbonded along the surfaces between points 44 and 46 to define with member 40 an expansible chamber 48 (FIG. 3). The elastomeric element 42 is cast in the chamber 41 in a manner previously explained. Member 40 is threaded to receive a plug or fitting 49 which provides communication to a port 50 defined in member 40 to allow the introduction of fluid under pressure into the expansible chamber. When hydraulic fluid is introduced into chamber 48, element 42 is compressed about sleeve 38 which, in turn, compresses the sleeve about the shaft therethrough and clamps the device 30 thereon, thereby positioning and locking it in a desired position.

FIG. 6 illustrates the deformation of element 42 when chamber 48 is expanded. It will be apparent that the forces exerted on the bonded surfaces of element 42 and member 40 are placed in compression with essentially no shearing forces exerted thereon.

When it is desired to release the clamp, the fluid pressure applied to the expansible chamber is relieved and the elasticity of the material comprising element 39 aids in forcing the fluid back toward its source.

It will be noted that the ends of the elastomeric elements are rounded or curved in both of the disclosed embodiments and the bonding thereof commences or ceases, dependent on the manner viewed at a point substantially tangential to the curve. This construction aids in assuring that the surface of bond is always placed primarily in compression when the cell is expanded and reduces any tendency of shearing along the surfaces of bond. The apparatus of FIGS. 5 and 6, if desired, may be made with one piece forming both of members 32 and 40.

Inasmuch as the cell essentially fills the chamber provided therefor and is of an essentially incompressible material, expansion thereof is only in a direction to compress the clamping element against a shaft therethrough. The clamping element in a relaxed position fits very closely about a shaft therethrough. Therefore, only a relatively small amount of fluid must be introduced into the expansible chamber to actuate the clamping device, with the result that very high clamping pressures may be rapidly achieved.

Fluid may be applied to the clamping device from any source of fluid pressure.

FIG. 7 schematically illustrates a suitable hydraulic system which comprises a source of fluid 51, a pump 51a, pressure regulating valve 52, a bi-directional valve 53, a hydraulic intensifier 54 and a pressure relief valve 55 in a well known arrangement. In operation, pump 51a draws the hydraulic fluid from source 51, the pressure thereof is regulated at valve 52 and applied through valve 53 through the intensifier which amplifies the pressure and applies it to one or more clamping devices, as disclosed. Valve 53 may be operated by a solenoid 53a which, when actuated, will relieve the pressure applied to the intensifier 54 and allow the return of hydraulic fluid to source 51. It is to be understood that a hydraulic system as shown in FIG. 7 may be utilized to actuate a plurality of clamping devices simultaneously.

It may thus be seen that the objects of the invention set forth above as well as those made apparent from the foregoing description are efficiently attained. Other embodiments of the invention and modifications to the disclosed embodiment thereof which do not depart from the spirit and scope of the invention may occur to others skilled in the art. Accordingly, the appended claims are intended to cover all modifications and embodiments of the invention which do not depart from the spirit and scope thereof.

What is claimed is:

1. A clamping device comprising an annular housing member, a clamping member of generally cylindrical configuration within said housing member defining an annular cavity therewith, said clamping member adapted to fit about a shaft received therethrough, an expansible cell formed in the shape of and filling said cavity, said cell comprising a first elastomeric member of generally sleeve-like configuration, a second elastomeric member formed about said first member and bonded to the outer surface thereof, said first and second elastomeric members between the unbonded surfaces thereof defining a cylindrical expansible chamber, there being a passage defined in said housing and said first and second members to allow introduction of fluid under pressure to said chamber so that said chamber is expanded and said clamping member is compressed against a shaft therethrough.

2. The device of claim 1 wherein a passage defining member extends through said first and second members to the chamber defined by said unbonded surfaces, there being an aperture in said housing member providing communication to said defined passage, said passage defining member being of greater dimension than said aperture.

3. The device of claim 1, wherein the ends of said sleeve member are rounded and the surface of bond between said sleeve member and said second member terminates at tangents to said rounded edges.

4. A clamping device comprising an annular housing member, a clamping member of generally cylindrical configuration within said housing and defining an annular cavity therebetween, said clamping member adapted to receive and closely fit about a shaft received therethrough, a rigid member of annular configuration received within said cavity, said member defining an annular elongated recess therein opening toward said clamping member, and a mass of resilient material filling said recess and bonded to said member along surfaces encompassing 360°, said material being unbonded to said member along a generally cylindrical surface, there being a port defined in said housing and said member to said cylindrical surface so that fluid under pressure may be introduced to the unbonded area between said member and said material and produce expansion therebetween and force said clamping member against the shaft therethrough.

5. A clamping device comprising an annular housing member, a clamping member of generally cylindrical configuration within said housing and defining an annular cavity therebetween, said clamping member adapted to receive and closely fit about a shaft received therethrough, a rigid member of annular configuration received within and filling said cavity, said member defining an annular recess therein opening toward said clamping member, a mass of resilient material filling said recess and bonded to said member along the end surfaces of said rigid member defining said cavity encompassing 360°, said material being unbonded to said member along a generally cylindrical surface, there being a port defined in said housing and said member to said cylindrical surface so that fluid under pressure may be introduced to the unbonded area between said member and said material and produce expansion therebetween and force said clamping member against the shaft therethrough, the surfaces of bond of said material to said member being so contoured that upon expansion said bonded surfaces are placed primarily in compression.

6. The device of claim 5, wherein said recess is defined with outwardly extending annular pockets at the ends thereof, and said material fills said pockets when fluid is not introduced to said unbonded area.

7. A clamping device comprising an annular housing member, a clamping member of generally cylindrical configuration within said housing defining an annular cavity therewith, said clamping member adapted to fit about a shaft received therethrough, an expansible cell filling said cavity, said cell comprising a first elastomeric member of generally sleeve-like configuration, a second elastomeric member formed about said first member and bonded to the outer surface thereof, said first and second elastomeric members between the unbonded surface thereof defining a cylindrical expansible chamber, a passage-defining member extending through said first and second elastomeric members to the chamber defined by said unbonded surfaces, there being an aperture in said housing member providing communication to said defined passage, said passage-defining member being of greater dimension than said aperture, said passage-defining member being received within the bounds of said first and second members and having a surface generally defined by a portion of a sphere, said surface being bonded to said first and second members.

8. A clamping device comprising an annular housing member, a clamping member of generally cylindrical configuration within said housing member defining an annular cavity therewith, said clamping member adapted to fit about a shaft received therethrough, an expansible cell filling said cavity, said cell comprising a first elastomeric member of generally sleeve-like configuration, a second elastomeric member formed about said first member and bonded to the outer surface thereof, said first and second elastomeric members between the unbonded surfaces thereof defining a cylindrical expansible chamber, there being a passage defined in said housing and said first and second elastomeric members to allow introduction of fluid under pressure to said chamber so that said chamber is expanded and said clamping member is compressed against a shaft therethrough, the ends of said sleeve member being rounded and the surface of bond between said sleeve member and said second elastomeric member terminating at tangents to said rounded edges, said ends being flared outwardly and having a thickness greater than the portion of said sleeve member intermediate the ends.

9. A clamping device comprising an annular housing member, a clamping member of generally cylindrical configuration within said housing and defining an annular cavity therebetween, said clamping member adapted to receive and closely fit about a shaft received therethrough, a rigid member of annular configuration received within and filling said cavity, said member defining an annular recess therein opening toward said clamping member, a mass of resilient material filling said recess and bonded to said member along the end surfaces of said rigid member defining said cavity encompassing 360°, said material being unbonded to said member along a generally cylindrical surface, there being a port defined in said housing and said member to said cylindrical surface so that fluid under pressure may be introduced to the unbonded area between said member and said material and produce expansion therebetween and force said clamping member against the shaft therethrough, the surfaces of bond of said material to said member being so contoured that upon expansion said bonded surfaces are placed primarily in compression, said recess being defined with outwardly extending annular pockets of generally L shape in longitudinal half section with all corners defining said pockets formed on a radius, and said material fills said pockets when fluid is not introduced to said unbonded area.

10. The device of claim 9, wherein said material is bonded to said member at the end walls defining said recess continuing into said pockets and the bond terminates along a line defined substantially at a tangent to one of said radius corners.

References Cited
UNITED STATES PATENTS

| | | | |
|---|---|---|---|
| 1,772,210 | 8/1930 | Dale. | |
| 2,394,785 | 2/1946 | Kindervater. | |
| 2,518,625 | 8/1950 | Langstaff | 251—5 X |
| 2,637,345 | 5/1953 | Kraft | 192—88 X |
| 2,732,232 | 1/1956 | Whitfield. | |
| 2,746,709 | 5/1956 | Minor | 251—5 X |
| 2,843,349 | 7/1958 | Meyer | 251—5 X |
| 2,845,146 | 7/1958 | Jones et al. | 192—88 X |

DONALD A. GRIFFIN, *Primary Examiner.*